United States Patent
Sviberg

(10) Patent No.: US 9,403,425 B1
(45) Date of Patent: Aug. 2, 2016

(54) CONVERTIBLE VEHICLE HAVING A TOP AND A REAR WINDOW

(71) Applicant: Webasto-Edscha Cabrio GmbH, Stockdorf (DE)

(72) Inventor: Magnus Sviberg, Deggendorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/603,475

(22) Filed: Jan. 23, 2015

(51) Int. Cl.
- *B60J 7/14* (2006.01)
- *B60J 7/20* (2006.01)
- *B60J 7/16* (2006.01)
- *B60J 1/18* (2006.01)

(52) U.S. Cl.
CPC .............. *B60J 7/143* (2013.01); *B60J 1/1823* (2013.01); *B60J 7/1692* (2013.01); *B60J 7/20* (2013.01); *B60J 7/203* (2013.01)

(58) Field of Classification Search
CPC ............ B60J 1/18; B60J 1/107; B60J 1/1823; B60J 7/14; B60J 7/143; B60J 7/145; B60J 7/16; B60J 7/1628; B60J 7/1664; B60J 7/1692; B60J 7/20; B60J 7/202; B60J 7/203
See application file for complete search history.

(56) References Cited

U.S. PATENT DOCUMENTS

| | | | |
|---|---|---|---|
| 6,257,650 B1 * | 7/2001 | Lee | B60J 7/1692 296/107.01 |
| 7,172,236 B1 | 2/2007 | Chevtsov | |
| 7,172,242 B2 * | 2/2007 | Heselhaus | B60J 7/1265 296/107.09 |
| 7,404,587 B2 | 7/2008 | Brockhoff | |
| 8,220,861 B2 * | 7/2012 | Czornyj | B60J 7/1226 296/107.01 |
| 8,459,719 B2 * | 6/2013 | Schulzki | B60J 7/0053 280/756 |
| 8,746,776 B2 * | 6/2014 | Schulzki | B60J 7/0053 280/756 |
| 2006/0125281 A1 | 6/2006 | Brockhoff | |

FOREIGN PATENT DOCUMENTS

| | | | | |
|---|---|---|---|---|
| DE | 102 54 366 A1 | | 6/2004 | |
| DE | 10345296 A1 | * | 5/2005 | ............. B60J 7/0061 |
| DE | 102004019913 B3 | * | 12/2005 | ............. B60J 7/1692 |
| DE | 102004047912 A1 | * | 4/2006 | ............. B60J 1/1823 |
| DE | EP 1683670 A1 | * | 7/2006 | ............... B60J 7/143 |
| DE | 102005037911 B3 | * | 1/2007 | ............. B60J 7/028 |
| DE | 102006007361 A1 | * | 8/2007 | ................ B60J 7/20 |
| DE | 102006017518 A1 | * | 10/2007 | ............. B60J 7/145 |

(Continued)

*Primary Examiner* — Glenn Dayoan
*Assistant Examiner* — Paul Chenevert
(74) *Attorney, Agent, or Firm* — Fitch, Even, Tabin & Flannery LLP

(57) ABSTRACT

A convertible vehicle includes a top movable between a closed position covering a vehicle interior and a storage position uncovering the vehicle interior. The top is arranged in a rear top accommodating space in the storage position and includes a linkage with a link arrangement on each side of a vertical longitudinal center plane of the vehicle. The link arrangement includes two main links pivotably mounted at a respective main bearing and each connected to the main bearing via a lower articulation point and to at least one roof link via an upper articulation point. At least one rigid roof shell is fixed at a respective one of the roof links, which, in the closed position, spans the vehicle interior in a direction transverse to the top. The vehicle includes a substantially vertical rear window arranged toward the front of the vehicle with respect to the top accommodating space.

7 Claims, 5 Drawing Sheets

(56) References Cited

FOREIGN PATENT DOCUMENTS

| | | | | |
|---|---|---|---|---|
| DE | 102008010414 A1 * | 8/2009 | | B60J 7/143 |
| DE | 102011119500 A1 * | 5/2013 | | B60J 7/08 |
| FI | EP 2610096 A2 * | 7/2013 | | B60J 7/1234 |
| FR | 2878473 A1 * | 6/2006 | | B60J 7/1692 |
| FR | 2891235 A1 * | 3/2007 | | B60J 7/20 |
| FR | WO 2007042867 A1 * | 4/2007 | | B60J 7/0076 |
| FR | 2980405 A3 * | 3/2013 | | B60J 7/1692 |

* cited by examiner

CONVERTIBLE VEHICLE HAVING A TOP AND A REAR WINDOW

FIELD

Described herein are convertible vehicles having a convertible top movable between a closed position for spanning a vehicle interior and a storage position for uncovering the vehicle interior, and having a rear window arranged closer to the front of the vehicle with respect to the convertible top accommodating space, which, in relation to a vehicle construction, has a substantially vertical orientation and which, on both sides, in relation to a vertical longitudinal center plane of the vehicle, is limited by a pillar that is fixed relative to the vehicle.

BACKGROUND

Vehicles described herein are known and may have the attributes of a sports car. A typical convertible top may be movable between a closed position for spanning and covering a vehicle interior and a storage position for uncovering the vehicle interior. Convertible tops are often stored in a top accommodating space of the vehicle when in the storage position. The movement of a convertible top from the closed position to the storage position and vice versa is typically carried out by means of a linkage that, on both sides, in relation to a vertical longitudinal center plane of the vehicle, may each include one link arrangement, respectively, with the link arrangement having two main links pivotably mounted at a respective main bearing.

For designing a main four-arm hinge, the two main links may be connected to the main bearing via a lower articulation point and to at least one roof link via an upper articulation point. At least one rigid roof shell may be fixed at the roof link. The roof shell, in the closed position, may span across a top of the vehicle interior. Typically, the vehicle may be provided with a rear window which is arranged toward the front of the vehicle with respect to the convertible top accommodating space. In other words, in relation to the vehicle orientation, the rear window is in front or closer to the front of the vehicle than the top accommodating space. The rear window, at least in the closed position, in relation to the vehicle construction, often has a substantially vertical orientation. In addition, the rear window, on both sides, in relation to the vertical longitudinal center plane of the vehicle, is often limited by a pillar that is fixed relative to the vehicle. The pillars may be part of a rollover protection system of the vehicle.

SUMMARY

It is an object of the present embodiments to provide a vehicle having a convertible top and a rear window, which is laterally limited by a pillar which may have an increased stiffness as compared to known solutions.

In one embodiment, a convertible vehicle, having a convertible top movable between a closed position for spanning and covering a vehicle interior and a storage position for uncovering the vehicle interior, the convertible top being arranged in a rear top accommodating space when in the storage position. The top includes a linkage that, on each of the sides, in relation to a vertical longitudinal center plane of the vehicle, includes one link arrangement. The link arrangement includes two main links which are pivotably mounted at a respective main bearing, and which are respectively connected to the main bearing via a lower articulation point and to at least one roof link via an upper articulation point, at which roof link at least one rigid roof shell is fixed. The roof shell, in the closed position, spans and covers the vehicle interior in a direction transverse to the top, and the two main links form a main multi-arm hinge together with the main bearing and with the roof link. the convertible vehicle has a rear window which is arranged toward the front with respect to the top accommodating space and which, in relation to the vehicle construction, has a substantially vertical orientation and which, on both sides, in relation to the vertical longitudinal center plane of the vehicle, is limited by a pillar that is fixed relative to the vehicle. In the closed position of the top, the upper articulation points of the main links are arranged toward the rear with respect to a rear upper edge of the pillars and the roof links reach over the pillars.

In the convertible vehicle according to one approach, at least a majority of the mechanism which is formed by the main links, for actuating the roof shell, is arranged toward the rear of the vehicle with respect to the rear window and with respect to the pillars limiting the rear window laterally, such that the roof links may reach over the pillars. In this embodiment, a gap for the passage of the main links in the closed position of the top, which gap could weaken the overall structure, is not required.

Advantageously, in one embodiment the articulation points of the main links to the roof link are not only arranged toward the rear of the vehicle with respect to a straight line defined by the upper rear pillar edges, but also in one or two planes, which are positioned above the upper surfaces of the pillars that are fixed relative to the vehicle.

According to one approach, in order to be able to design a vehicle construction to be as stiff as possible, and in order to be able to allocate, through the pillars, a rollover function that meets high requirements, each of the pillars are is designed so as to be continuous between the rear window and a lateral outer side of the vehicle. Each of the pillars may include one upper surface or limiting surface, respectively, which is designed without any steps. In this embodiment, each of the pillars are solid and may continuously extend from the rear window to the respective outer side of the vehicle.

In an advantageous embodiment of the convertible vehicle according to the invention, an interior paneling of the vehicle interior, in the region between the rear window and an outer edge in relation to the vertical longitudinal center plane of the vehicle, has an upper edge which is designed without any steps. In this embodiment, due to the fact that the roof links reach over the pillars and that the main links are arranged toward the rear with respect to the pillars, a harmonious appearance of the interior paneling in the region of the pillars can advantageously be realized.

In one embodiment of the convertible vehicle according to one approach, in the storage position of the convertible top, each of the linkage passage regions are closed through one linkage outlet flap, which abuts against the upper surface of the respective pillar and/or against the upper edge of the interior paneling. In this embodiment, due to the simplified geometry of the pillars and of the interior paneling, the linkage outlet flaps may also present a simplified geometry, which in turn advantageously results in low production costs.

In an embodiment of the convertible vehicle according to one approach, in order to cover up the displacing kinematics for the roof shell, which kinematics are formed by the main links, a top storage space lid is provided which, in the closed position of the top, at the very least in regions that reach over the pillars, is adjacent to roof shell and aligned therewith. The linkage outlet flaps may be articulated to the top storage space lid.

The top of the convertible vehicle according to some embodiments may be designed with one shell or with multiple shells. One exemplary embodiment may include a first roof shell and a second roof shell which, in the closed position of the top, are arranged one behind the other and aligned with each other and which, in the storage position of the top, with a camber being oriented in the same direction, are arranged one above the other in the top accommodating space in a so-called onion fold.

Further advantages and advantageous configurations of the subject-matter of the invention can be taken from the description, from the drawing and from the claims.

DETAILED DESCRIPTION

Figure 1:
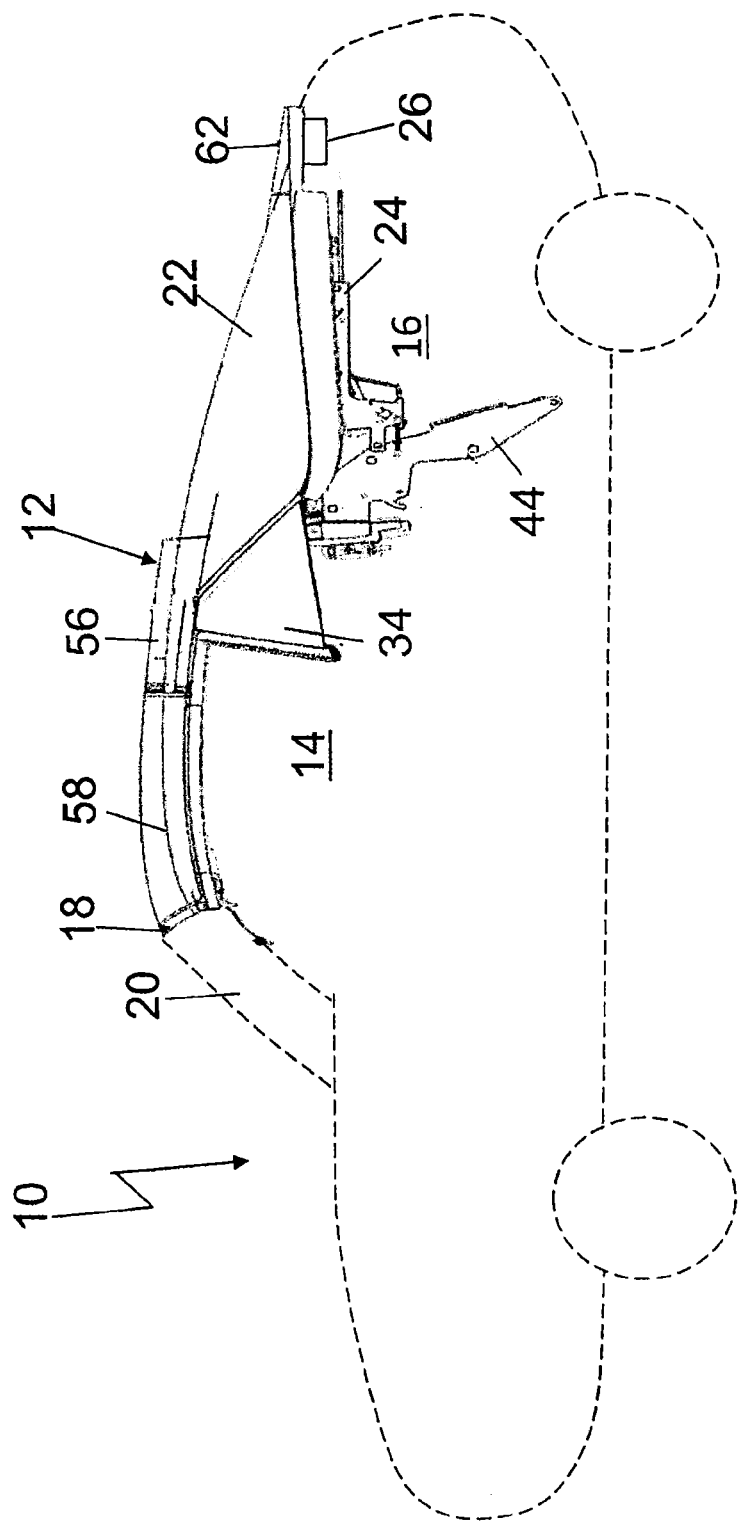
FIG. 1 shows a side view of a convertible vehicle according to one of the present embodiments having a top.

With reference to FIG. 1, an exemplary embodiment of a convertible vehicle 10 is illustrated, which is provided with a displaceable top 12 which can be displaced or moved between a closed position for covering a vehicle interior 14 and a storage position for uncovering the vehicle interior 14 at the top. The top 12 may be arranged in a top storage space 16 shown in FIGS. 1 and 5. As shown in FIG. 1, in the closed position of the top 12 a front edge of the top 12 is secured at an upper frame piece 18 of a frame of a windshield 20 of the convertible vehicle 10 via a clasp, which is not illustrated in more detail here. In the embodiment illustrated in FIG. 1, the top storage space 16 may be closed by means of a top storage space lid 22, which may be pivoted about a pivot axis, which is formed by a lid hinge-joint 26, by means of a lid mechanism 24. A motor compartment of the vehicle, which is not illustrated in more detail in FIG. 1, is arranged below the top storage space 16.

Figure 4:
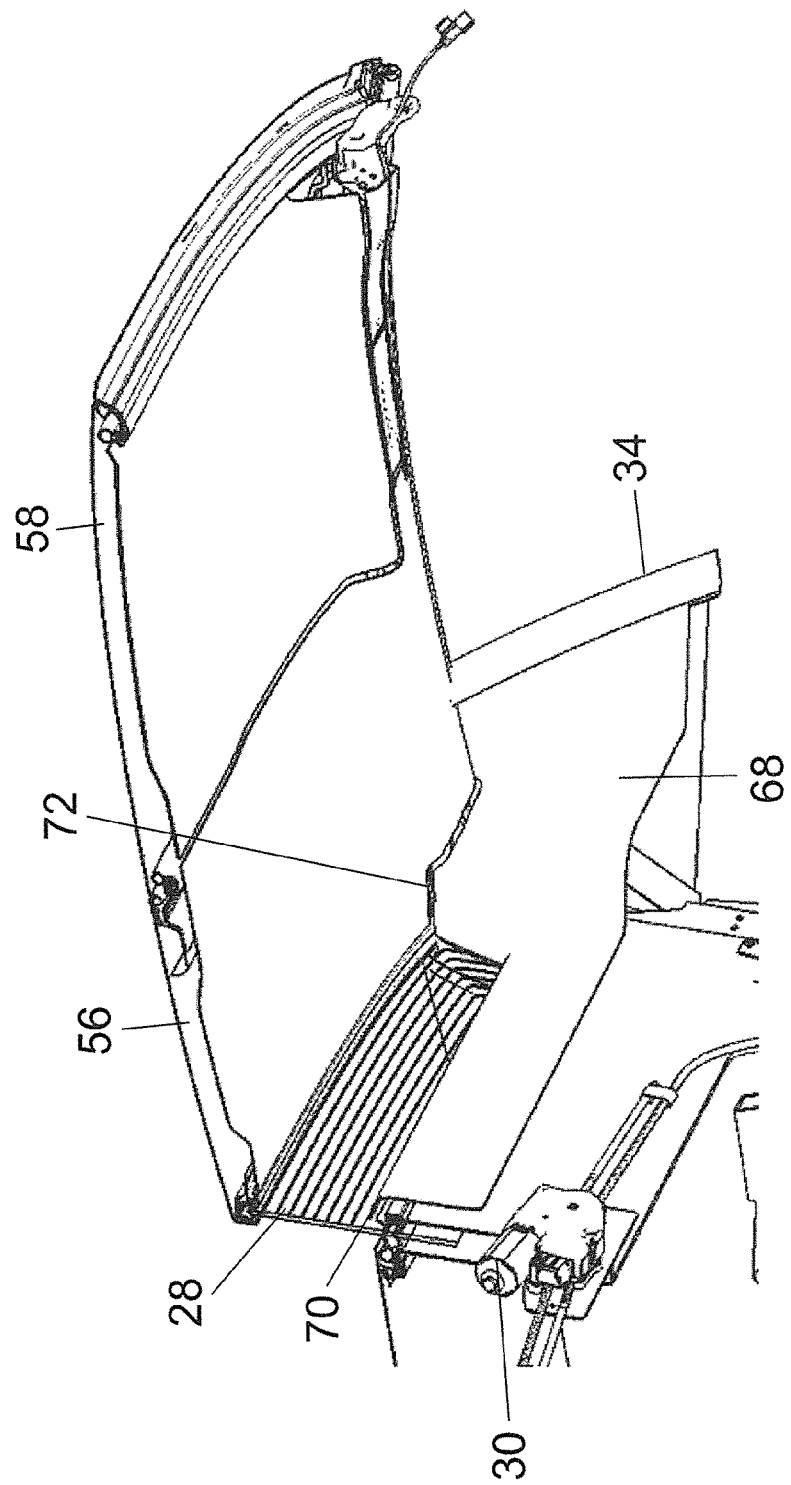
FIG. 4 shows a perspective view of an interior paneling of the vehicle of FIG. 1 with the top being in the closed position.
Figure 5:
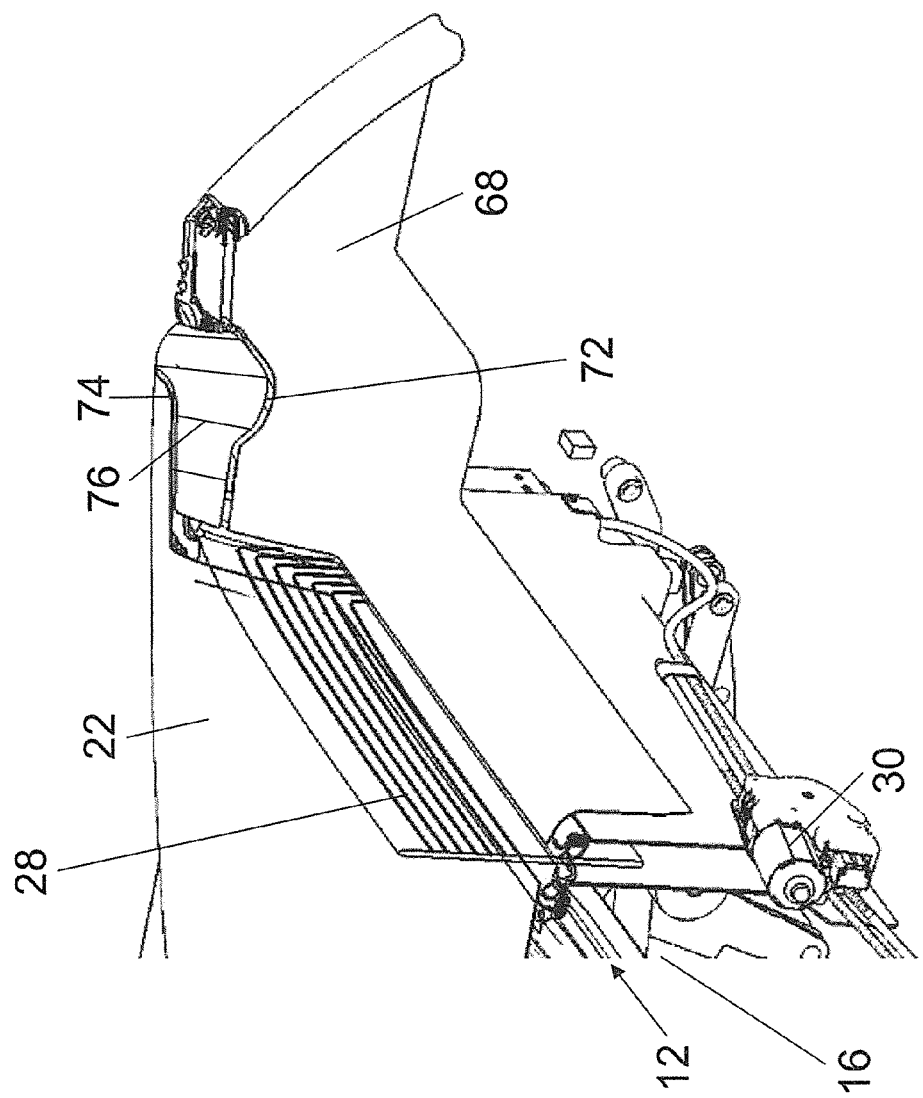
FIG. 5 shows a perspective view of the interior paneling of the vehicle of FIG. 4 with the top being in the storage position.

In the embodiment illustrated in FIGS. 4 and 5, the convertible vehicle 10 includes a rear window 28 which has a substantially vertical orientation (e.g. deviating no more than up to about 20 degrees off vertical) and which is movable by means of a lifting including a drive motor 30. The rear window 28, on both sides, is in each instance limited by a pillar 32, which stretches to an outer side of the vehicle 10 in a continuous way. The rear window 28 may be at least partially covered by a blind 34. The pillars 32 are part of a rollover protection system, which is operative in the storage position of the top 12. The rear window 28 may be separately moved between an uncovering position and a closed position by means of the drive motor 30 independently from an actuation of the top 12, and may be stopped and held in each interim position.

Figure 2:
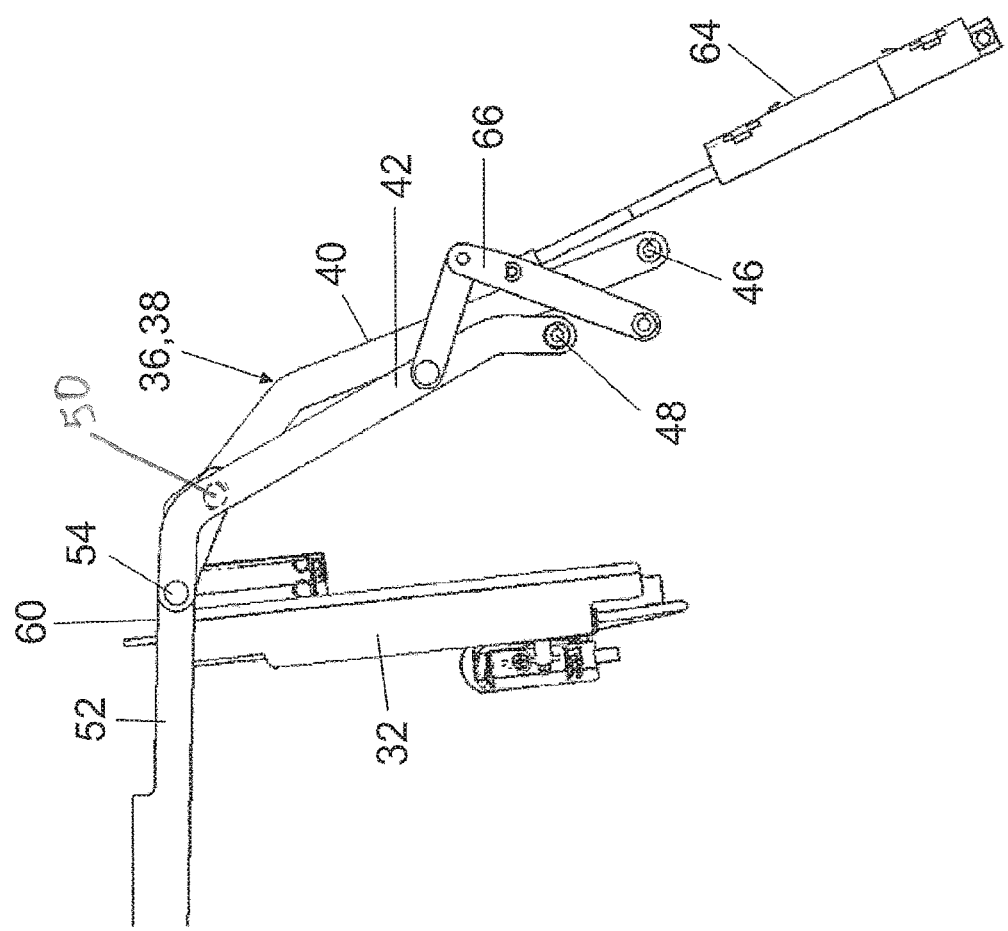
FIG. 2 shows an enlarged fragmentary side view of the top of FIG. 1 in a linking region to a main bearing that is fixed relative to the vehicle.
Figure 3:
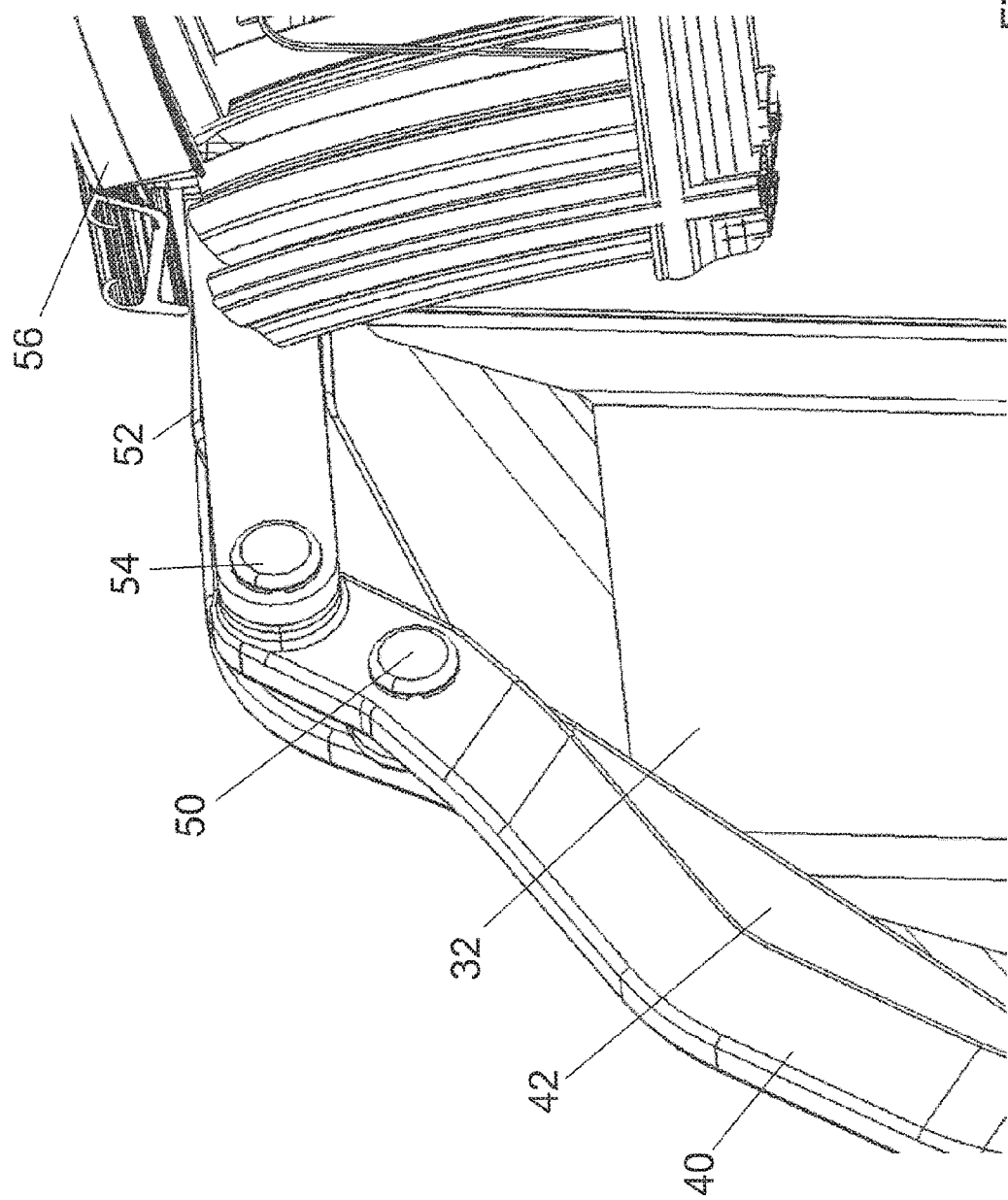
FIG. 3 shows an enlarged fragmentary perspective view of an upper portion of a main four-arm hinge of the top of FIG. 2.

In the embodiment illustrated in FIG. 2, the top 12 includes a linkage 36 that, on both sides, in relation to a vertical longitudinal center plane of the vehicle 10, has one link arrangement 38, respectively. The link arrangement 38 includes two main links 40 and 42, which are pivotably mounted, via hinge points 46 and 48, at a main bearing 44 that is associated with the respective link arrangement 38 and that is fixed relative to the vehicle 10. As shown in FIGS. 2 and 3, the main link 40 is connected to a roof link 52 via an upper hinge point 50, whereas the main link 42 is connected to the roof link 52 via an upper hinge point 54. This means that the main bearing 44, the two main links 40 and 42 and the roof link 52 form a main four-arm hinge of the respective link arrangement 38. As shown in FIG. 1, two rigid roof shells 56 and 58 are linked to the roof link 52 and are aligned with each other and arranged one behind the other in the closed position of the top 12 such that the front roof shell 58 is adjacent to the frame 18 of the windshield 20.

It will be appreciated that the top 12 is designed mirror-symmetrically relating to a vertical longitudinal center plane of the vehicle 10, which is why, for reasons of clarity, only the parts of the top 10 that are arranged on the left in relation to the forward direction of travel of the vehicle 10 are illustrated in the drawings. The parts of the top 12 that are arranged on the right are mirror images and designed correspondingly.

As seen in FIG. 2, the roof links 52 reach over the pillars 32 in the closed position of the top 12. In the illustrated embodiment, the articulation points 50 and 54 of the main links 40 and 42 to the roof link 52 are arranged toward the rear with respect to an upper rear edge 60 of the pillars 32, which upper rear edge 60 extends in a direction transverse to the vehicle 10. In other words, the main links 40 and 42 are offset to the rear starting from the pillars 32, such that an upper surface or limiting surface of the pillars 32 may be designed without any steps.

In the embodiment illustrated in FIG. 1, in closed position of the top storage space lid 22 and in the closed position of the top 12, the top storage space lid 22 extends from a rear edge of the rear roof shell 56 and from the lateral blind 34 up to a rear body region 62, such that the top storage space 16 is completely covered. Additionally, the top storage space lid 22, in the closed position, is locked to the frame of the vehicle 10 by means of the lid mechanism 24.

As can be seen in FIGS. 4 and 5, the vehicle interior 14 is provided on its rear side with an interior paneling 68, which includes a rear window cut-out 70 and follows the inner edge of the respective pillar 32, at the side edges of the rear window 28, which edges are adjacent to the pillars 32. The rear window cut-out 70 has one upper edge 72 on each side in the region of the pillars 32, which upper edge 72 is guided up to the blind 34, substantially without any steps, following the upper surface of the respective pillars 32, the blind 34 being part of the outer skin of the vehicle 10 that is fixed relative to the vehicle 10. As can be seen in FIG. 4, the upper edge 72, in the closed position of the top 12, is adjacent to an interior paneling 68 of the rear roof shell 56.

With reference to FIG. 5, in the storage position of the top 12 link passage regions 74 are located between the top storage space lid 22 and the interior paneling 68. The linkage passage regions 74 are each covered up by a linkage outlet flap 76, which is articulated to the top storage space lid 22 and abuts against the upper edge 72 of the interior paneling 68. In the closed position of the top 12, a respective roof link 52 reaches through the corresponding linkage passage region 74.

In order to move the top 12 from the closed position into the storage position, the top storage space lid 22 is initially moved into an open position by means of the lid mechanism 24. The rear window 28 may simultaneously be lowered by means of the drive motor 30. Then, the top 12 may be actuated through actuation of displacing cylinders 64, which are supported at the main bearings 44 and each act on the respective main links 40 and 42 via a reduction gearing 66. As a result, the locking with respect to the frame piece 18 of the windshield frame is released, which subsequently causes the main links 40 and 42 to pivot through actuation of the displacing cylinders 64 and to store the two roof shells 56 and 58 one above the other in the top storage space 16 and the front roof shell 58 to be stored above the rear roof shell 56. In the storage position, a roof clasp (not shown) may lock the top 12 with respect to the frame of the vehicle 10.

After the top 12 is stored in the top storage space 16, the top storage space lid 22 is moved back to its closed position for covering the top storage space 16 and is locked to the frame of the vehicle 10. The rear window 28 may also be lifted again in order to serve as a wind blocker for the vehicle interior 14.

While the embodiments herein disclosed has been described by means of specific examples and applications thereof, numerous modifications and variations could be made thereto by those skilled in the art without departing from the scope of the embodiment as set forth in the claims.

The invention claimed is:

1. A convertible vehicle, comprising: a top which is displaceable between a closed position for covering a vehicle interior and a storage position for uncovering the vehicle interior, the top being arranged in a rear top accommodating space in the storage position, the top including a linkage including a link arrangement on each side of a vertical longitudinal center plane of the vehicle, the link arrangement comprising two main links pivotably mounted at a respective main bearing, the two main links each being connected to the main bearing via a lower articulation point and to at least one roof link via an upper articulation point, at least one roof shell being fixed at the at least one roof link, the at least one roof shell, in the closed position, spans the vehicle interior in a direction transverse to the top, the two main links forming a main multi-arm hinge together with the main bearing and the at least one roof link, a rear window arranged toward the front of the vehicle relative to the top accommodating space, the rear window being substantially vertical, the rear window being limited by a pillar fixed relative the vehicle on each side of a vertical longitudinal center plane of the vehicle, wherein, in the closed position of the top, the upper articulation point of each of the main links is arranged toward the rear of the vehicle with respect to a rear upper edge of each of the pillars and the at least one roof link reaches over each of the pillars.

2. The convertible vehicle of claim 1, wherein each of the pillars is continuous between the rear window and a lateral outer side of the vehicle, and wherein each of the pillars includes one upper surface.

3. The convertible vehicle of claim 1, further comprising an interior paneling, wherein the interior paneling of the vehicle interior, in a region between the rear window and an outer edge in relation to the vertical longitudinal center plane of the vehicle, has an upper edge.

4. The convertible vehicle of claim 1, further comprising linkage passage regions, wherein, in the storage position of the top, each of the linkage passage regions is closed via a linkage outlet flap, the linkage outlet flap being oriented to abut an upper edge of an interior paneling of the vehicle.

5. The convertible vehicle of claim 1, further comprising a top storage space lid, wherein the top storage space lid, in the closed position of the top, covers the main links and, at least in regions that reach over each of the pillars, is adjacent to and aligned with the at least one roof shell.

6. The convertible vehicle according to claim 1, wherein the at least one roof shell includes a first roof shell and a second roof shell, wherein the first and second roof shells, in the closed position of the top, are arranged one behind the other and are aligned with each other and wherein, in the storage position of the top, the first and second roof shells are arranged one above the other in the top accommodating space.

7. The convertible vehicle according to claim 1, wherein the main multi-arm hinge is a main four-arm hinge.

* * * * *